United States Patent
Iwasaki

(10) Patent No.: US 8,599,402 B2
(45) Date of Patent: Dec. 3, 2013

(54) SECURE CLOUD BASED PRINTING

(75) Inventor: Manabu Iwasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 34 days.

(21) Appl. No.: 13/486,577

(22) Filed: Jun. 1, 2012

(65) Prior Publication Data

US 2013/0163036 A1     Jun. 27, 2013

(30) Foreign Application Priority Data

Dec. 26, 2011    (JP) .................................. 2011-282877

(51) Int. Cl.
    *G06K 15/00*      (2006.01)
(52) U.S. Cl.
    USPC ......................................... 358/1.14; 358/1.15
(58) Field of Classification Search
    USPC ................................................. 358/1.14, 1.15
    See application file for complete search history.

(56) References Cited

U.S. PATENT DOCUMENTS

2010/0225950 A1     9/2010   Yasuhara

FOREIGN PATENT DOCUMENTS

| JP | A-8-314647 | 11/1996 |
| JP | A-2005-352567 | 12/2005 |

*Primary Examiner* — Eric A Rust

(74) *Attorney, Agent, or Firm* — Oliff & Berridge, PLC

(57) ABSTRACT

A printing apparatus includes a first memory, a second memory, a first obtaining section, a second obtaining section, and a retrieving section. The first memory stores information concerning a registrant who has registered the printing apparatus as a print destination with a holding apparatus. The second memory stores information concerning an instructor who provides an instruction instructing the holding apparatus to hold print data that is to be used in printing performed by the printing apparatus. The first obtaining section obtains obtainment information. The second obtaining section obtains print-data identification information. The retrieving section retrieves, from the obtainment information, obtainment information which includes the print-data identification information and which is to be used to obtain print data that is held by the holding apparatus in accordance with the instruction and that is to be used in printing performed by the printing apparatus.

12 Claims, 13 Drawing Sheets

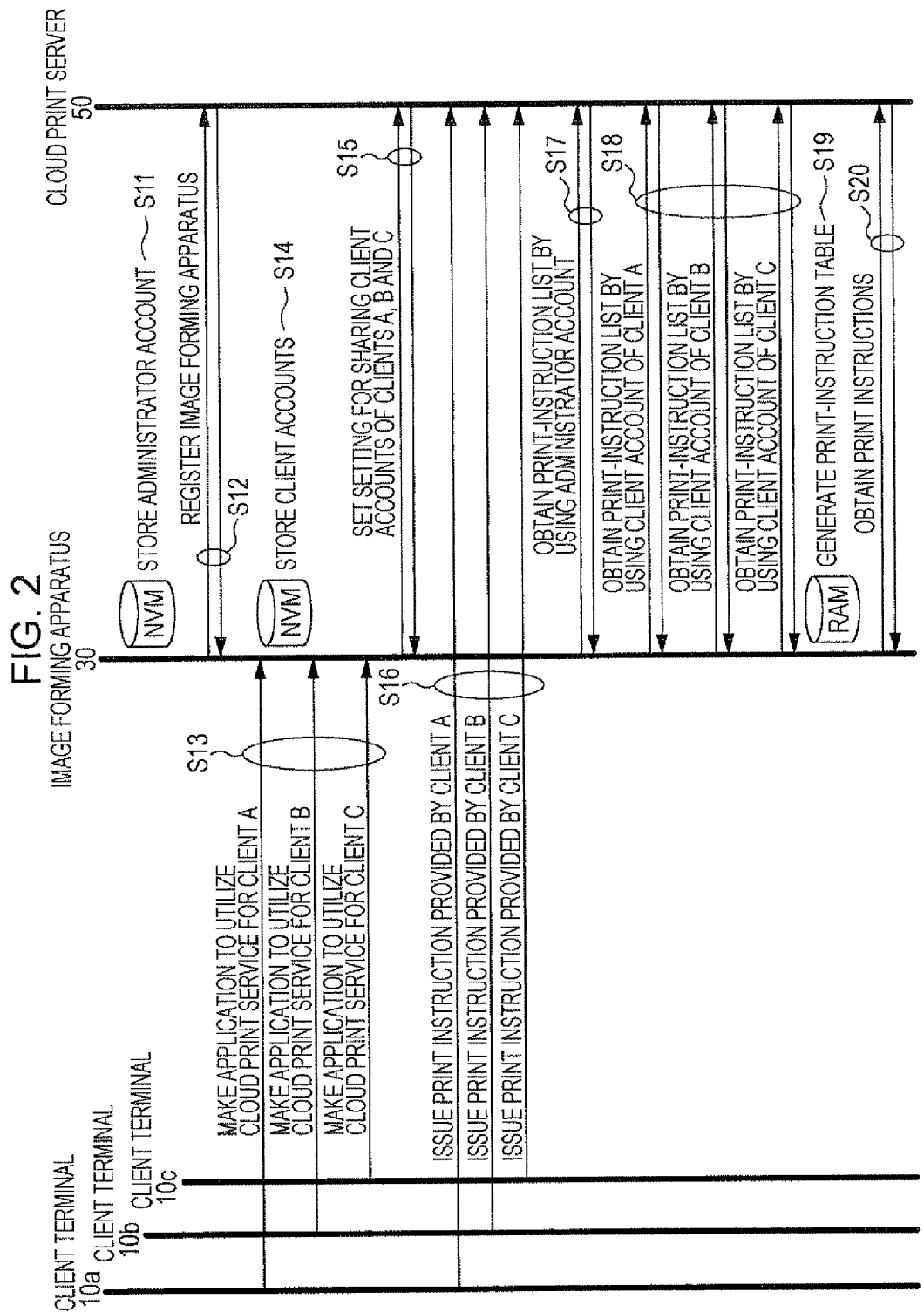

FIG. 3

| NUMBER | PRINT-INSTRUCTION ID | PRINTER ID | FILE URL | TICKET URL | NUMBER OF PAGES | GENERATION DATE AND TIME | PRINTER NAME | USER NAME |
|---|---|---|---|---|---|---|---|---|
| 1 | 20111025-001 | abc-0001 | https://www.xxcp.com/dl/id=20111025-001 | https://www.xxcp.com/tk/id=20111025-0001 | 2 | 1319439401275 | MFP(1) | ADMINISTRATOR |
| 2 | 20111025-002 | abc-0001 | https://www.xxcp.com/dl/id=20111025-002 | https://www.xxcp.com/tk/id=20111025-0002 | 1 | 1319439402218 | MFP(1) | ADMINISTRATOR |
| 3 | 20111025-003 | abc-0001 | https://www.xxcp.com/dl/id=20111025-003 | https://www.xxcp.com/tk/id=20111025-0003 | 3 | 1319439403161 | MFP(1) | ADMINISTRATOR |
| 4 | 20111025-004 | abc-0001 | https://www.xxcp.com/dl/id=20111025-004 | https://www.xxcp.com/tk/id=20111025-0004 | 1 | 1319439404104 | MFP(1) | ADMINISTRATOR |
| 5 | 20111025-005 | abc-0001 | https://www.xxcp.com/dl/id=20111025-005 | https://www.xxcp.com/tk/id=20111025-0005 | 5 | 1319439405047 | MFP(1) | ADMINISTRATOR |
| 6 | 20111026-001 | abc-0001 | https://www.xxcp.com/dl/id=20111026-001 | https://www.xxcp.com/tk/id=20111026-0001 | 2 | 1319439405990 | MFP(1) | ADMINISTRATOR |
| 7 | 20111026-002 | abc-0001 | https://www.xxcp.com/dl/id=20111026-002 | https://www.xxcp.com/tk/id=20111026-0002 | 1 | 1319439406933 | MFP(1) | ADMINISTRATOR |
| 8 | 20111026-003 | abc-0001 | https://www.xxcp.com/dl/id=20111026-003 | https://www.xxcp.com/tk/id=20111026-0003 | 3 | 1319439407876 | MFP(1) | ADMINISTRATOR |
| 9 | 20111026-004 | abc-0001 | https://www.xxcp.com/dl/id=20111026-004 | https://www.xxcp.com/tk/id=20111026-0004 | 1 | 1319439408819 | MFP(1) | ADMINISTRATOR |
| 10 | 20111026-005 | abc-0001 | https://www.xxcp.com/dl/id=20111026-005 | https://www.xxcp.com/tk/id=20111026-0005 | 1 | 1319439409762 | MFP(1) | ADMINISTRATOR |

FIG. 4A

| NUMBER | PRINT-INSTRUCTION ID |
|---|---|
| 1 | 20111025-001 |
| 2 | 20111025-005 |
| 3 | 20111026-003 |

FIG. 4B

| NUMBER | PRINT-INSTRUCTION ID |
|---|---|
| 1 | 20111025-002 |
| 2 | 20111025-003 |
| 3 | 20111026-001 |

FIG. 4C

| NUMBER | PRINT-INSTRUCTION ID |
|---|---|
| 1 | 20111025-004 |
| 2 | 20111026-002 |
| 3 | 20111026-004 |
| 4 | 20111026-005 |

FIG. 5

| NUMBER | PRINT-INSTRUCTION ID | PRINTER NAME | FILE URL | TICKET URL | NUMBER OF PAGES | GENERATION DATE AND TIME | USER NAME |
|---|---|---|---|---|---|---|---|
| 1 | 20111025-001 | MFP(1) | https://www.xxcp.com/dl/id=20111025-001 | https://www.xxcp.com/tk/id=20111025-0001 | 2 | 1319439401275 | CLIENT A |
| 2 | 20111025-002 | MFP(1) | https://www.xxcp.com/dl/id=20111025-002 | https://www.xxcp.com/tk/id=20111025-0002 | 1 | 1319439402218 | CLIENT B |
| 3 | 20111025-003 | MFP(1) | https://www.xxcp.com/dl/id=20111025-003 | https://www.xxcp.com/tk/id=20111025-0003 | 3 | 1319439403161 | CLIENT B |
| 4 | 20111025-004 | MFP(1) | https://www.xxcp.com/dl/id=20111025-004 | https://www.xxcp.com/tk/id=20111025-0004 | 1 | 1319439404104 | CLIENT C |
| 5 | 20111025-005 | MFP(1) | https://www.xxcp.com/dl/id=20111025-005 | https://www.xxcp.com/tk/id=20111025-0005 | 5 | 1319439405047 | CLIENT A |
| 6 | 20111026-001 | MFP(1) | https://www.xxcp.com/dl/id=20111026-001 | https://www.xxcp.com/tk/id=20111026-0001 | 2 | 1319439405990 | CLIENT B |
| 7 | 20111026-002 | MFP(1) | https://www.xxcp.com/dl/id=20111026-002 | https://www.xxcp.com/tk/id=20111026-0002 | 1 | 1319439406933 | CLIENT C |
| 8 | 20111026-003 | MFP(1) | https://www.xxcp.com/dl/id=20111026-003 | https://www.xxcp.com/tk/id=20111026-0003 | 3 | 1319439407876 | CLIENT A |
| 9 | 20111026-004 | MFP(1) | https://www.xxcp.com/dl/id=20111026-004 | https://www.xxcp.com/tk/id=20111026-0004 | 1 | 1319439408819 | CLIENT C |
| 10 | 20111026-005 | MFP(1) | https://www.xxcp.com/dl/id=20111026-005 | https://www.xxcp.com/tk/id=20111026-0005 | 1 | 1319439409762 | CLIENT C |

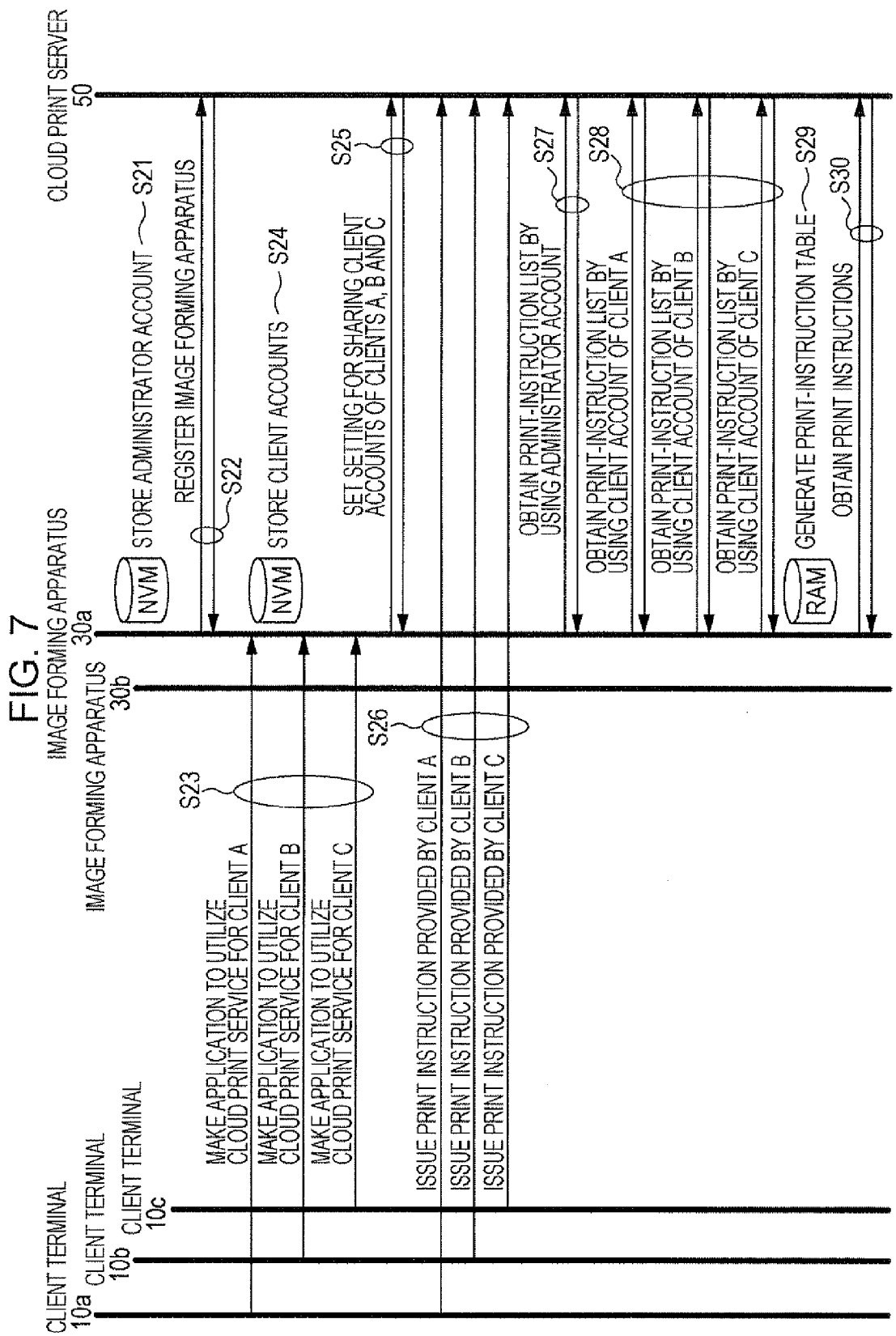

FIG. 8

| NUMBER | PRINT-INSTRUCTION ID | PRINTER ID | FILE URL | TICKET URL | NUMBER OF PAGES | GENERATION DATE AND TIME | PRINTER NAME | USER NAME |
|---|---|---|---|---|---|---|---|---|
| 1 | 20111025-001 | abc-0001 | https://www.xxcp.com/dl/id=20111025-001 | https://www.xxcp.com/tk/id=20111025-0001 | 2 | 1319439401275 | MFP(1) | ADMINISTRATOR |
| 2 | 20111025-002 | abc-0002 | https://www.xxcp.com/dl/id=20111025-002 | https://www.xxcp.com/tk/id=20111025-0002 | 1 | 1319439402218 | MFP(2) | ADMINISTRATOR |
| 3 | 20111025-003 | abc-0001 | https://www.xxcp.com/dl/id=20111025-003 | https://www.xxcp.com/tk/id=20111025-0003 | 3 | 1319439403161 | MFP(1) | ADMINISTRATOR |
| 4 | 20111025-004 | abc-0002 | https://www.xxcp.com/dl/id=20111025-004 | https://www.xxcp.com/tk/id=20111025-0004 | 1 | 1319439404104 | MFP(2) | ADMINISTRATOR |
| 5 | 20111025-005 | abc-0001 | https://www.xxcp.com/dl/id=20111025-005 | https://www.xxcp.com/tk/id=20111025-0005 | 5 | 1319439405047 | MFP(1) | ADMINISTRATOR |
| 6 | 20111026-001 | abc-0002 | https://www.xxcp.com/dl/id=20111026-001 | https://www.xxcp.com/tk/id=20111026-0001 | 2 | 1319439405990 | MFP(2) | ADMINISTRATOR |
| 7 | 20111026-002 | abc-0001 | https://www.xxcp.com/dl/id=20111026-002 | https://www.xxcp.com/tk/id=20111026-0002 | 1 | 1319439406933 | MFP(1) | ADMINISTRATOR |
| 8 | 20111026-003 | abc-0002 | https://www.xxcp.com/dl/id=20111026-003 | https://www.xxcp.com/tk/id=20111026-0003 | 3 | 1319439407876 | MFP(2) | ADMINISTRATOR |
| 9 | 20111026-004 | abc-0001 | https://www.xxcp.com/dl/id=20111026-004 | https://www.xxcp.com/tk/id=20111026-0004 | 1 | 1319439408819 | MFP(1) | ADMINISTRATOR |
| 10 | 20111026-005 | abc-0002 | https://www.xxcp.com/dl/id=20111026-005 | https://www.xxcp.com/tk/id=20111026-0005 | 1 | 1319439409762 | MFP(2) | ADMINISTRATOR |

FIG. 9A

| NUMBER | PRINT-INSTRUCTION ID |
|---|---|
| 1 | 20111025-001 |
| 2 | 20111025-005 |
| 3 | 20111026-003 |

FIG. 9B

| NUMBER | PRINT-INSTRUCTION ID |
|---|---|
| 1 | 20111025-002 |
| 2 | 20111025-003 |
| 3 | 20111026-001 |

FIG. 9C

| NUMBER | PRINT-INSTRUCTION ID |
|---|---|
| 1 | 20111025-004 |
| 2 | 20111026-002 |
| 3 | 20111026-004 |
| 4 | 20111026-005 |

FIG. 10A

| NUMBER | PRINT-INSTRUCTION ID | PRINTER NAME | FILE URL | TICKET URL | NUMBER OF PAGES | GENERATION DATE AND TIME | USER NAME |
|---|---|---|---|---|---|---|---|
| 1 | 20111025-001 | MFP(1) | https://www.xxcp.com/dl/id=20111025-001 | https://www.xxcp.com/tk/id=20111025-0001 | 2 | 1319439401275 | CLIENT A |
| 3 | 20111025-003 | MFP(1) | https://www.xxcp.com/dl/id=20111025-003 | https://www.xxcp.com/tk/id=20111025-0003 | 3 | 1319439403161 | CLIENT B |
| 5 | 20111025-005 | MFP(1) | https://www.xxcp.com/dl/id=20111025-005 | https://www.xxcp.com/tk/id=20111025-0005 | 5 | 1319439405047 | CLIENT A |
| 7 | 20111026-002 | MFP(1) | https://www.xxcp.com/dl/id=20111026-002 | https://www.xxcp.com/tk/id=20111026-0002 | 1 | 1319439406933 | CLIENT C |
| 9 | 20111026-004 | MFP(1) | https://www.xxcp.com/dl/id=20111026-004 | https://www.xxcp.com/tk/id=20111026-0004 | 1 | 1319439408819 | CLIENT C |

FIG. 10B

| NUMBER | PRINT-INSTRUCTION ID | PRINTER NAME | FILE URL | TICKET URL | NUMBER OF PAGES | GENERATION DATE AND TIME | USER NAME |
|---|---|---|---|---|---|---|---|
| 2 | 20111025-002 | MFP(2) | https://www.xxcp.com/dl/id=20111025-002 | https://www.xxcp.com/tk/id=20111025-0002 | 1 | 1319439402218 | CLIENT B |
| 4 | 20111025-004 | MFP(2) | https://www.xxcp.com/dl/id=20111025-004 | https://www.xxcp.com/tk/id=20111025-0004 | 1 | 1319439404104 | CLIENT C |
| 6 | 20111026-001 | MFP(2) | https://www.xxcp.com/dl/id=20111026-001 | https://www.xxcp.com/tk/id=20111026-0001 | 2 | 1319439405990 | CLIENT B |
| 8 | 20111026-003 | MFP(2) | https://www.xxcp.com/dl/id=20111026-003 | https://www.xxcp.com/tk/id=20111026-0003 | 3 | 1319439407876 | CLIENT A |
| 10 | 20111026-005 | MFP(2) | https://www.xxcp.com/dl/id=20111026-005 | https://www.xxcp.com/tk/id=20111026-0005 | 1 | 1319439409762 | CLIENT C |

SECURE CLOUD BASED PRINTING

CROSS-REFERENCE TO RELATED APPLICATIONS

This application is based on and claims priority under 35 USC 119 from Japanese Patent Application. No. 2011-282877 filed Dec. 26, 2011.

BACKGROUND (i) Technical Field

The present invention relates to a printing apparatus, a print system, a printing method, and a non-transitory computer-readable medium.

SUMMARY

According to an aspect of the invention, there is provided a printing apparatus including a first memory, a second memory, a first obtaining section, a second obtaining section, and a retrieving section. The first memory stores a registrant information item concerning a registrant who has registered the printing apparatus as a print destination with a holding apparatus. The holding apparatus holds a print data item that is to be used for printing at the print destination. The second memory stores an instructor information item concerning an instructor who provides an instruction instructing the holding apparatus to hold a print data item that is to be used in printing performed by the printing apparatus. The first obtaining section obtains multiple obtainment information items by executing a command, the command being a command to obtain an information item concerning a print data item held by the holding apparatus, using the registrant information item stored in the first memory. Each of the multiple obtainment information items is an information item that includes one of multiple print-data identification information items with which multiple print data items to be used in printing performed by the printing apparatus are identified and that is to be used to obtain one of the multiple print data items. The second obtaining section obtains, by executing the command using the instructor information item stored in the second memory, at least one of print-data identification information items with which at least one of print data items held by the holding apparatus in accordance with an instruction provided by the instructor is identified. The retrieving section retrieves, from the multiple obtainment information, items obtained by the first obtaining section, at least one of obtainment information items including the at least one of print-data identification information items obtained by the second obtaining section. One of the at least one of obtainment information items retrieved by the retrieving section is an information item to be used to obtain a print data item that is held by the holding apparatus in accordance with the instruction provided by the instructor and that is to be used in printing performed by the printing apparatus.

BRIEF DESCRIPTION OF THE DRAWINGS

Exemplary embodiments of the present invention will be described in detail based on the following figures, wherein:

FIG. 2 is a sequence diagram illustrating an example of a flow of a process performed in the cloud print system according to the first exemplary embodiment of the present invention;

FIG. 3 is a diagram illustrating an example of an administrator print-instruction list that is obtained in the first exemplary embodiment of the present invention;

FIGS. 4A to 4C are diagrams illustrating examples of client print-instruction lists that are obtained in the first exemplary embodiment of the present invention;

FIG. 5 is a diagram illustrating an example of a print-instruction table that is generated in the first exemplary embodiment of the present invention;

FIG. 7 is a sequence diagram illustrating an example of a flow of a process performed in the cloud print system according to the second exemplary embodiment of the present invention;

FIG. 8 is a diagram illustrating an example of an administrator print-instruction list that is obtained in the second exemplary embodiment of the present invention;

FIGS. 9A to 9C are diagrams illustrating examples of client print-instruction lists that are obtained in the second exemplary embodiment of the present invention;

FIGS. 10A and 10B are diagrams illustrating examples of print-instruction tables that are generated in the second exemplary embodiment of the present invention;

DETAILED DESCRIPTION

Hereinafter, exemplary embodiments of the present invention will be described in detail with reference to the accompanying drawings.

First Exemplary Embodiment

Figure 1:
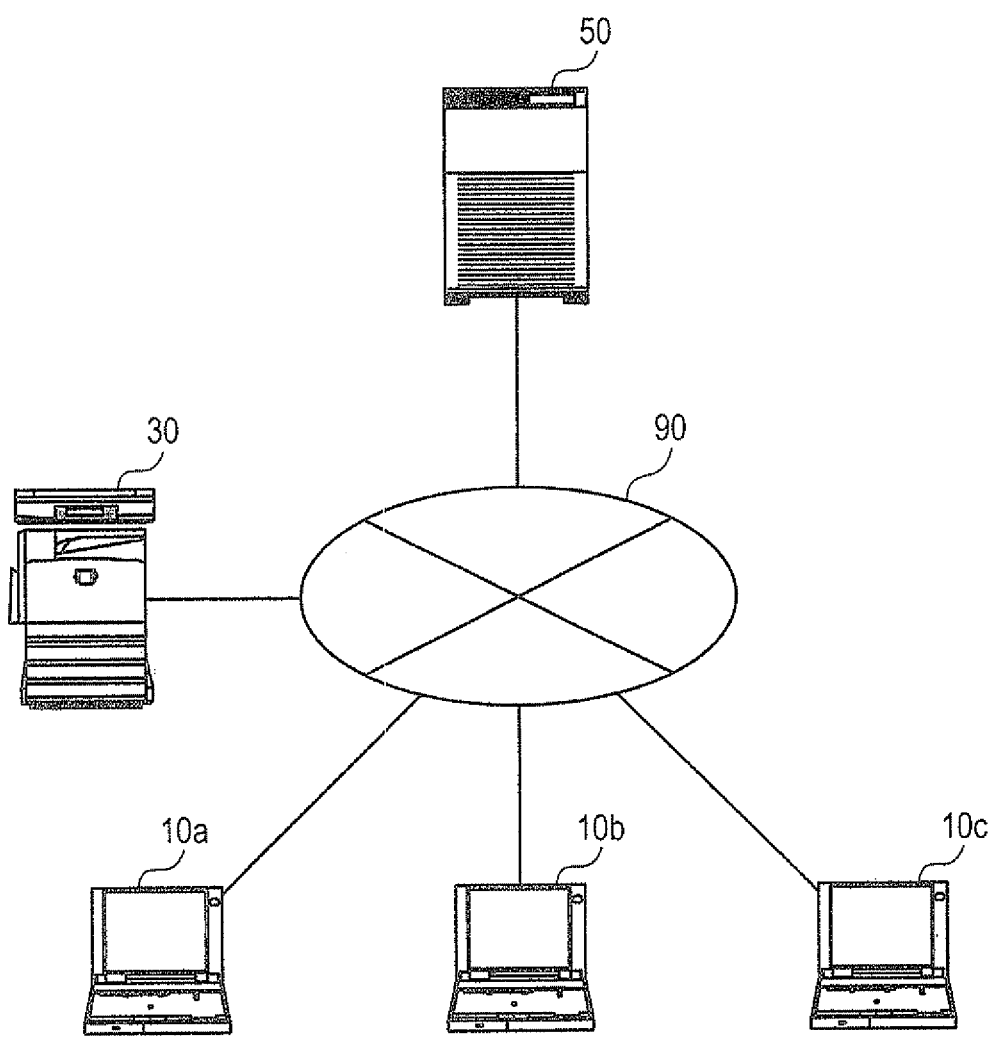
FIG. 1 is a diagram illustrating an example of a configuration of a cloud print system according to a first exemplary embodiment of the present invention.

FIG. 1 is a diagram illustrating an example of an entire configuration of a cloud print system according to a first exemplary embodiment.

As illustrated in FIG. 1, in the cloud print system, client terminals 10a to 10c, an image forming apparatus 30, and a cloud print server 50 are connected to a network 90.

Note that, although the client terminals 10a to 10c are illustrated in FIG. 1, when it is not necessary to distinguish the client terminals 10a to 10c from one another, the client terminals 10a to 10c are referred to as client terminals 10. Moreover, although the only three client terminals 10 are illustrated in FIG. 1, four or more client terminals 10 may be provided.

Each of the client terminals 10 is a computer apparatus that instructs, in accordance with an operation performed by a user, the cloud print server 50 to print a document with the image forming apparatus 30. More specifically, the client terminal 10 transmits, to the cloud print server 50, a document that is a print target, print settings (the number of copies, a layout, a color mode, and so forth), and a specification of the image forming apparatus 30 serving as a print destination. Furthermore, the client terminal 10 is also used for a case in which the user makes an application to utilize cloud print service. Here, as the client terminal 10, a personal computer (PC), a mobile terminal, a mobile phone, or the like may be used.

The image forming apparatus 30 is an apparatus that forms, on a recording medium such as a sheet of paper, an image formed on a document, and that outputs the recording medium as a print medium. Typically, two or more image forming apparatuses are connected to the network 90. However, here, supposing that a certain administrator registers the image forming apparatus 30, which is one of the two or more image forming apparatuses, as a print destination with the cloud print server 50, the only image forming apparatus 30 is illustrated. Here, as the image forming apparatus 30, an apparatus having the only printer function may be used, or an apparatus having another image processing function, such as a scanner function or a facsimile function, together with the printer function may be used. In the present exemplary embodiment, the image forming apparatus 30 is provided as an example of a printing apparatus.

The cloud print server 50 is a server computer that provides service (the cloud print service) which enables a user to print a document with the image forming apparatus 30 which is installed in home, in office, in a public place, or the like. More specifically, when a document that is a print target, print settings, and a print destination are transmitted from one of the client terminals 10, the document is converted into a document file such as a portable document format (PDF) file, and a print instruction including the document file and the print settings is stored so that the print instruction is associated with the print destination. Then, when the cloud print server 50 receives a request for printing from the image forming apparatus 30, the cloud print server 50 transmits, to the image forming apparatus 30, the print instruction that is associated with the image forming apparatus 30 as a print destination. In the present exemplary embodiment, the print instruction is used as an example of a print data item, and the cloud print server 50 is provided as an example of a holding apparatus that holds the print data item.

The network 90 is a communication medium that is used for information communication among the client terminals 10, the image forming apparatus 30, and the cloud print server 50. The network 90 may be, for example, the Internet.

In the cloud print system illustrated in FIG. 1, printing of documents by multiple users is realized by sharing the image forming apparatus 30, which has been registered with the cloud print service by the administrator (a user who first registers the image forming apparatus 30), with clients (users other than the administrator). However, in a case of printing a document with the image forming apparatus 30, although a print instruction is transmitted from the cloud print server 50 to the image forming apparatus 30, an information item with which a user is identified is not transmitted. Accordingly, a user who has made a request for printing cannot be determined. Thus, who owns printed matter that is to be output cannot be determined, and the user convenience is not good. Furthermore, it is also impossible to support a function (an authentication print function, a private print function, or the like) of performing printing only when user authentication has succeed on the basis of an information item that has been input on an operation panel 35 (see FIG. 11) of the image forming apparatus 30.

For this reason, in the first exemplary embodiment, information items concerning print instructions are obtained from the cloud print server 50 by using an administrator account. User accounts are temporarily switched to client accounts. The information items concerning print instructions are obtained on a client-account-by-client-account basis. The information items are examined so that the print instructions are managed on a user-by-user basis.

First, an overall operation in the first exemplary embodiment will be described. Note that, here, it is supposed that clients A, B, and C who utilize the client terminals 10a, 10b, and 10c, respectively, share the image forming apparatus 30.

FIG. 2 is a sequence diagram for explaining this overall operation. Note that, in FIG. 2, each of the right arrows indicates transmission of a request for a process described above the right arrow. Each of the left arrows illustrated below a corresponding one of the right arrows indicates transmission of a result of the process.

As illustrated in FIG. 2, first, the image forming apparatus 30 sets an administrator account, for example, in a hard disk drive (HDD) 34 (see FIG. 11) in accordance with a request from the administrator (step S11). The image forming apparatus 30 registers itself with the cloud print server 50 (step S12).

Next, each of the clients A, B, and C performs an operation of making an application to utilize the cloud print service on a web screen of a corresponding one of the client terminals 10a, 10b, and 10c, whereby the client terminals 10a, 10b, and 10c make, to the image forming apparatus 30, applications to utilize the cloud print service for the clients A, B, and C, respectively (step S13). Alternatively, each of the clients A, B, and C may perform an operation of making an application to utilize the cloud print service on the operation panel 35 (see FIG. 11) of the image forming apparatus 30, whereby the client may make an application to utilize the cloud print service to the image forming apparatus 30. Accordingly, the image forming apparatus 30 sets client accounts in, for example, the HDD 34 (see FIG. 11) (step S14). Then, a setting for sharing the client accounts, which have been set in step S14, is set for the image forming apparatus 30, which has been registered in step S12 (step S15).

Moreover, the clients A, B, and C arbitrarily provide print instructions instructing printing with the image forming apparatus 30 in the cloud print service (step S16).

After that, the image forming apparatus 30 calls, for example, a JOB LIST API, by using the administrator account, thereby obtaining a list of print instructions that are associated with the image forming apparatus 30 as a print destination (hereinafter, referred to as an "administrator print-instruction list") from the cloud print server 50. The image forming apparatus 30 holds the obtained administrator print-instruction list therein (step S17).

Next, the image forming apparatus 30 calls, for example, the JOB LIST API by using the individual client accounts of the clients A, B, and C, thereby obtaining lists of print instructions provided by the individual clients (hereinafter, referred to as "client print-instruction lists") from the cloud print server 50. The image forming apparatus 30 holds the obtained client print-instruction lists therein (step S18).

Then, the image forming apparatus 30 verifies the administrator print-instruction list, which has been obtained in step S17, against the client print-instruction lists for the individual clients, which have been obtained in step S18. The image forming apparatus 30 generates a print-instruction table in which user information items are associated with all print instructions provided for the image forming apparatus 30. The image forming apparatus 30 stores the print-instruction table in a random access memory (RAM) 32 (see FIG. 11) of the image forming apparatus 30 (step S19). More specifically, first, the image forming apparatus 30 compares print-instruction identifications (IDs) included in the administrator print-instruction list with print-instruction IDs included in the client print-instruction list for each of the clients, and searches for the same print-instruction ID. Each of the print-instruction IDs is unique. Accordingly, when the same print-instruction ID has been found, this indicates that the print instruction having the print-instruction ID is a print instruction provided by the client.

Here, although information items concerning the print instructions are included in the print-instruction table, the print instructions are not included. Accordingly, in a case of performing printing with the image forming apparatus 30, it is necessary to obtain the print instructions. However, the print instructions can be obtained only by using the administrator account. Thus, the image forming apparatus 30 calls, for example, a JOB FETCH API by using the administrator account, thereby obtaining the print instructions (step S20).

Additionally, processes using the print instructions in reality are performed in a state in which, for each of the print instructions, a user who has provided the print instruction is determined on the basis of the print-instruction table stored in step S19. More specifically, user information items concerning the users who have provided the individual print instructions are output to a list screen (a print-state list screen) showing a state of printing based on the print instructions, a report (a print history report) in which results of printing based on the print instructions are printed, or the like. Furthermore, the print instructions may be temporarily stored in the image forming apparatus 30, and when a user makes a request for one of the print instructions, printing based on the print instruction may be performed. Moreover, the numbers of copies in a case of printing based on the print instructions may be managed on a user-by-user basis for the users who have provided the print instructions. Additionally, through collaboration between the print instructions and user output-authority information items (an output upper limit, a color limitation, and so forth) that are managed by the image forming apparatus 30 or an external server, a limitation may be imposed, on a user-by-user basis, on printing based on the print instructions.

Next, the processes of steps S17 to S19 illustrated in FIG. 2 will be described using specific examples.

FIG. 3 illustrates an example of the administrator print-instruction list that the image forming apparatus 30 obtains in step S17.

As illustrated in FIG. 3, the administrator print-instruction list is a list in which a number of an item "number", a print-instruction ID of an item "print-instruction ID", a printer ID of an item "printer ID", a file uniform resource locator (URL) of an item "file URL", a ticket URL of an item "ticket URL", the number of pages of an item "number of pages", a generation date and time of an item "generation date and time", a printer name of an item "printer name", and a user name of an item "user name" are associated with one another.

Among the items, the number of the item "number" is a number of a record included in the administrator print-instruction list. The print-instruction ID of the item "print-instruction ID" is an identification information item with which a print instruction is uniquely indentified. The printer ID of the item "printer ID" is an identification information item with which a printer (an image forming apparatus) that is to perform printing based on the print instruction is uniquely indentified.

The file URL of the item "file URL" is a URL of a document file, such as a page description language (PDL) file, that is obtained by converting a document which is a print target. The ticket URL of the item "ticket" URL is a URL of a setting file including print settings.

The number of pages of the item "number of pages" is the number of pages that are to be printed on the basis of the print instruction. The generation date and time of the item "generation date and time" is a date and time at which the print instruction was generated. The printer name of the item "printer name" is the name of the printer (the image forming apparatus) that is to perform printing based on the print instruction.

Moreover, the user name of the item "user name" is a name who has provided the print instruction. In step S17, the administrator print-instruction list is obtained by using the administrator account. Accordingly, "administrator" is set as the user name in all records included in the administrator print-instruction list. In other words, when the image forming apparatus 30 logs in to the cloud print server 50 with the administrator account, the image forming apparatus 30 can view all print instructions stored in the cloud printer sever 50. However, it seems as if all of the print instructions were print instructions provided by the administrator. Accordingly, the users who have provided the print instructions cannot be distinguished from one another.

FIGS. 4A to 4C illustrate examples of the client print-instruction lists that the image forming apparatus 30 obtains in step S18. FIG. 4A illustrates an example of the client print-instruction list obtained by using the client account of the client A. FIG. 4B illustrates an example of the client print-instruction list obtained by using the client account of the client B. FIG. 4C illustrates an example of the client print-instruction list obtained by using the client account of the client C.

As illustrated in FIGS. 4A to 4C, in any of the client print-instruction lists, a number of the item "number" and a print-instruction ID of the "print-instruction ID" are associated with each other. In step S18, the image forming apparatus 30 temporarily logs in to the cloud print server 50 with the client accounts, and obtains information items from the cloud print server 50. The information items that can be obtained here are only print-instruction IDs. Note that, because the details of the items "number" and "print-instruction ID" have already been mentioned in the description of FIG. 3, a description thereof is omitted here.

FIG. 5 illustrates an example of the print-instruction table that the image forming apparatus 30 generates in step S19.

As illustrated in FIG. 5, the print-instruction table is a table in which a number of the item "number", a print-instruction ID of the item "print-instruction ID", a printer name of the item "printer name", a file URL of the item "file URL", a ticket URL of the item "ticket URL", the number of pages of the item "number of pages", a generation date and time of the item "generation date and time", and a user name of the item "user name" are associated with one another. Note that, because the details of the items "number", "print-instruction ID", "printer name", "file URL", "ticket URL", "number of pages", "generation date and time", and "user name" have already been mentioned in the description of FIG. 3, a description thereof is omitted here.

In step S19, the print-instruction table is generated by verifying the administrator print-instruction list, which is illustrated in FIG. 3, against the client print-instruction lists for the individual clients, which are illustrated in FIGS. 4A to 4C. More specifically, the print-instruction table is generated by replacing each "administrator" of the item "user name" of the administrator print-instruction list illustrated in FIG. 3 with a client that has been used when a client print-instruction list including the corresponding print-instruction ID among the client print-instruction lists illustrated in FIGS. 4A to 4C has been obtained.

Furthermore, in the first exemplary embodiment, a source from which the administrator account and the client accounts are obtained is not specifically described. However, for example, as described below in a second exemplary embodiment, the administrator account and the client accounts may be held in an external server computer, and the image forming apparatus 30 may temporarily read and utilize the administrator account and the client accounts. Alternatively, the administrator account and the client accounts may be held in an ID card or the like, and the image forming apparatus 30 may temporarily read and utilize the administrator account and the client accounts. In any case, after the image forming apparatus 30 temporarily utilizes the administrator account and the client accounts, the image forming apparatus 30 may discard the administrator account and the client accounts from a security improvement point of view.

Second Exemplary Embodiment

Figure 6:
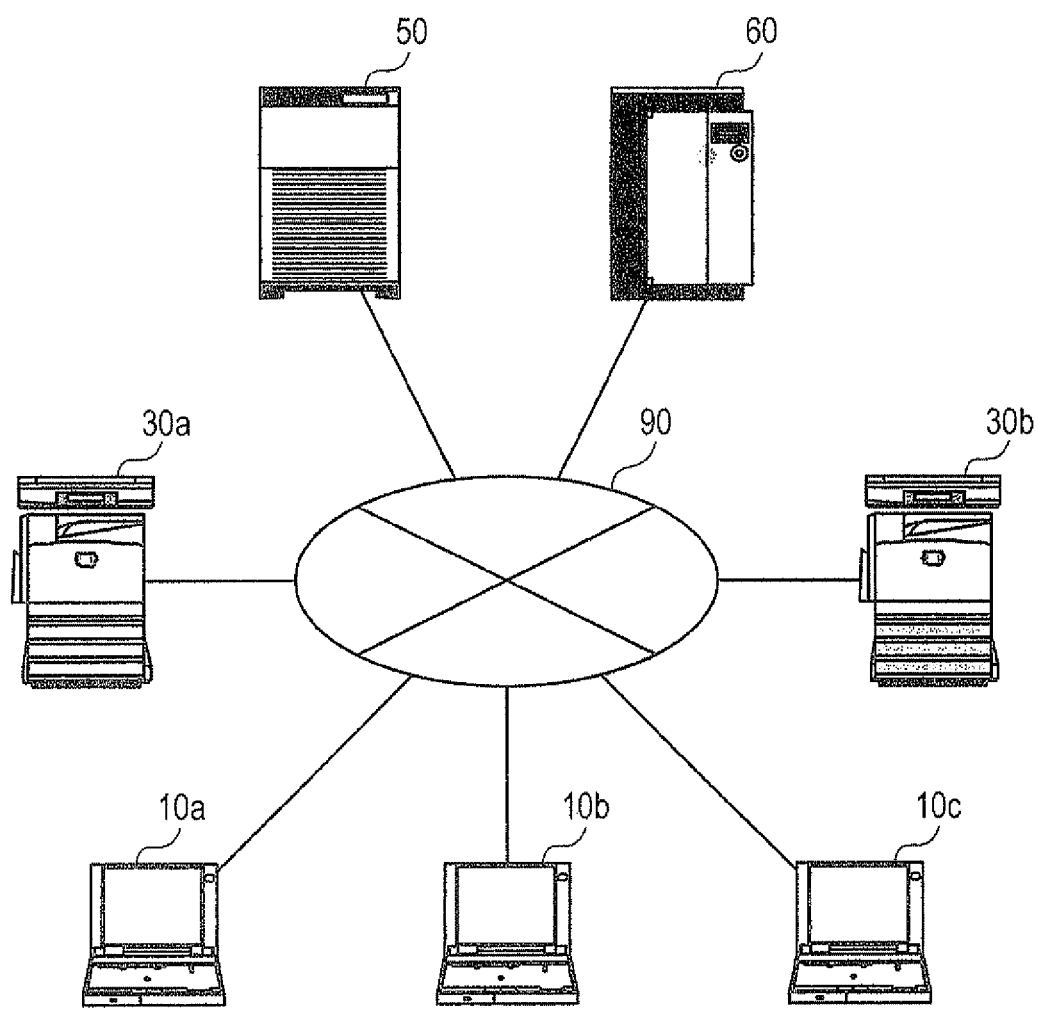
FIG. 6 is a diagram illustrating an example of a configuration of a cloud print system according to a second exemplary embodiment of the present invention.

FIG. 6 illustrates an example of an entire configuration of a cloud print system according to the second exemplary embodiment.

As illustrated in FIG. 6, in the cloud print system, client terminals 10a to 10c, image forming apparatuses 30a and 30b, a cloud print server 50, and an account management server 60 are connected to a network 90.

Note that, although the client terminals 10a to 10c are illustrated in FIG. 6, when it is not necessary to distinguish the client terminals 10a to 10c from one another, the client terminals 10a to 10c are referred to as client terminals 10. Moreover, although the only three client terminals 10 are illustrated in FIG. 6, four or more client terminals 10 may be provided.

Because the client terminals 10 and the cloud print server 50 used in the first exemplary embodiment are also used in the second exemplary embodiment, a description thereof is omitted here. Only the image forming apparatuses 30a and 30b and the account management server 60 will be described.

Each of the image forming apparatuses 30a and 30b is an apparatus that forms, on a recording medium such as a sheet of paper, an image formed on a document, and that outputs the recording medium as a print medium. Typically, three or more image forming apparatuses are connected to the network 90. However, here, supposing that a certain administrator registers the two image forming apparatuses 30a and 30b as print destinations among the three or more image forming apparatuses with the cloud print server 50, the two image forming apparatuses 30a and 30b are illustrated. However, when it is not necessary to distinguish the image forming apparatuses 30a and 30b from each other, the image forming apparatuses 30a and 30b are referred to as image forming apparatuses 30. Furthermore, the number of image forming apparatuses 30 that the certain administrator registers with the cloud print server 50 may be three or more. Here, as each of the image forming apparatuses 30, an apparatus having the only printer function may be used, or an apparatus having another image processing function, such as a scanner function or a facsimile function, together with the printer function may be used. In the present exemplary embodiment, the image forming apparatuses 30a and 30b are provided as examples of the printing apparatus.

The account management server 60 is a server computer that manages an administrator account and client accounts which are used in a case in which the image forming apparatus 30 obtains information items from the cloud print server 50.

The network 90 is a communication medium that is used for information communication among the client terminals 10, the image forming apparatuses 30, the cloud print server 50, and the account management server 60. The network 90 may be, for example, the Internet.

In the second exemplary embodiment, in a case in which the administrator registers the two image forming apparatuses 30 with the cloud print service in the cloud print system illustrated in FIG. 1, a process for addressing the issue mentioned in the first exemplary embodiment is performed. In other words, information items concerning print instructions are obtained from the cloud print server 50 by using the administrator account. User accounts are temporarily switched to the client accounts. The information items concerning print instructions are obtained on a client-account-by-client-account basis. The information items are examined so that the print instructions are managed on a user-by-user basis and an image-forming-apparatus-by-image-forming-apparatus basis.

First, an overall operation in the second exemplary embodiment will be described. Note that, here, it is supposed that the clients A, B, and C who utilize the client terminals 10a, 10b, and 10c, respectively, share both the image forming apparatuses 30a and 30b.

FIG. 7 is a sequence diagram for explaining this overall operation. Note that, in FIG. 7, each of the right arrows indicates transmission of a request for a process described above the right arrow. Each of the left arrows illustrated below a corresponding one of the right arrows indicates transmission of a result of the process.

As illustrated in FIG. 7, first, in accordance with a request from the administrator, the image forming apparatus 30a obtains the administrator account from the account management server 60, and sets the administrator account, for example, in the HDD 34 (see FIG. 11) (step S21). The image forming apparatus 30a registers itself with the cloud print server 50 (step S22).

Next, each of the clients A, B, and C performs an operation of making an application to utilize the cloud print service on a web screen of a corresponding one of the client terminals 10a, 10b, and 10c, whereby the client terminals 10a, 10b, and 10c make, to the image forming apparatus 30a, applications to utilize the cloud print service for the clients A, B, and C, respectively (step S23). Alternatively, each of the clients A, B, and C may perform an operation of making an application to utilize the cloud print service on the operation panel 35 (see FIG. 11) of the image forming apparatus 30a, whereby the client may make an application to utilize the cloud print service to the image forming apparatus 30a. Accordingly, the image forming apparatus 30a obtains the client accounts from the account management server 60, and sets the client accounts in, for example, the HDD 34 (see FIG. 11) (step S24). Then, a setting for sharing the client accounts, which have been set in step S24, is set for the image forming apparatus 30a, which has been registered in step S22 (step S25).

Moreover, the clients A, B, and C arbitrarily provide print instructions instructing printing with the image forming apparatus 30a in the cloud print service (step S26).

Meanwhile, the processes of steps S21 to S25 are also performed for the image forming apparatus 30b although the processes are not illustrated. The clients A, B, and C arbitrarily also provide print instructions instructing printing with the image forming apparatus 30b in the cloud print service as in step S26.

After that, the image forming apparatus 30a calls, for example, a JOB LIST API, by using the administrator account, thereby obtaining a list of print instructions that are associated with the image forming apparatus 30a as a print destination (hereinafter, referred to as an "administrator print-instruction list") from the cloud print server 50. The image forming apparatus 30a holds the obtained administrator print-instruction list therein (step S27).

Next, the image forming apparatus 30a calls, for example, the JOB LIST API by using the individual client accounts of the clients A, B, and C, thereby obtaining lists of print instructions provided by the individual clients (hereinafter, referred to as "client print-instruction lists") from the cloud print server 50. The image forming apparatus 30a holds the obtained client print-instruction lists therein (step S28).

Then, the image forming apparatus 30a verifies the administrator print-instruction list, which has been obtained in step S27, against the client print-instruction lists for the individual clients, which have been obtained in step S28. The image forming apparatus 30a extracts only the print instructions associated with the image forming apparatus 30a, and generates a print-instruction table in which the extracted print instructions are associated with user information items. The image forming apparatus 30a stores the print-instruction table in the RAM 32 (see FIG. 11) (step S29). More specifically, first, the image forming apparatus 30a compares each of printer IDs included in the administrator print-instruction list with the printer ID of the image forming apparatus 30a to narrow down records in the administrator print-instruction list to records including the same printer ID of the image forming apparatus 30a. Next, the image forming apparatus 30a compares print-instruction IDs included in the administrator print-instruction list, in which the records have been narrowed down, with print-instruction IDs included in the client print-instruction list for each of the clients, and searches for the same print-instruction ID. Each of the print-instruction ins is unique. Accordingly, when the same print-instruction ID has been found, this indicates that the print instruction having the print-instruction ID is a print instruction provided by the client.

Here, although information items concerning the print instructions are included in the print-instruction table, the print instructions are not included. Accordingly, in a case of performing printing with the image forming apparatus 30a, it is necessary to obtain the print instructions. However, the print instructions can be obtained only by using the administrator account. Thus, the image forming apparatus 30a calls, for example, a JOB FETCH API by using the administrator account, thereby obtaining the print instructions (step S30).

Additionally, processes using the print instructions in reality are performed in a state in which, for each of the print instructions, a user who has provided the print instruction is determined on the basis of the print-instruction table stored in step S29. More specifically, user information items concerning the users who have provided the individual print instructions are output to a list screen (a print-state list screen) showing a state of printing based on the print instructions, a report (a print history report) in which results of printing based on the print instructions are printed, or the like. Furthermore, the print instructions may be temporarily stored in the image forming apparatus 30a, and when a user makes a request for one of the print instructions, printing based on the print instruction may be performed. Moreover, the numbers of copies in a case of printing based on the print instructions may be managed on a user-by-user basis for the users who have provided the print instructions. Additionally, through collaboration between the print instructions and user output-authority information items (an output upper limit, a color limitation, and so forth) that are managed by the image forming apparatus 30a or an external server, a limitation may be imposed, on a user-by-user basis, on printing based on the print instructions.

Meanwhile, the image forming apparatus 30b also performs the processes of steps S27 to S29 although the processes are not illustrated. Additionally, the image forming apparatus 30b generates a print-instruction table in which user information items are associated with print instructions associated with the image forming apparatus 30b. Then, as in step S30, the image forming apparatus 30b obtains the print instructions, and outputs user information items to a print-state list screen, a print history report, or the like.

Note that, here, the administrator account and the client accounts are held in the account management server 60. Accordingly, from a security point of view, the image forming apparatuses 30a and 30b may temporarily utilize the administrator account and the client accounts, and may discard the administrator account and the client accounts after utilization of the administrator account and the client accounts finishes.

Next, the processes of steps S27 to S29 illustrated in FIG. 7 will be described using as specific examples.

FIG. 8 illustrates an example of the administrator print-instruction list that the image forming apparatuses 30 obtain in step S27.

As illustrated in FIG. 8, the administrator print-instruction list is a list in which a number of an item "number", a print-instruction ID of an item "print-instruction ID", a printer ID of an item "printer ID", a file URL of an item "file URL", a ticket URL of an item "ticket URL", the number of pages of an item "number of pages", a generation date and time of an item "generation date and time", a printer name of an item "printer name", and a user name of an item "user name" are associated with one another.

Among the items, because the details of the items "number", "print-instruction ID", "file URL", "ticket URL", "number of pages", and "generation date and time" have already been mentioned in the description of FIG. 3, a description thereof is omitted here.

The printer ID of the item "printer ID" is an identification information item with which a printer (an image forming apparatus) that is to perform printing based on the print instruction is uniquely indentified. The printer name of the item "printer name" is the name of the printer (the image forming apparatus) that is to perform printing based on the print instruction. Only values of the items "printer ID" and "printer name" of the administrator print-instruction list illustrated in FIG. 3 are different from those of the items "printer ID" and "printer name" of the administrator print-instruction list illustrated in FIG. 8. In other words, in the administrator print-instruction list illustrated in FIG. 3, the printer ID and the printer name of the only one image forming apparatus 30 are set as the values of the items "printer ID" and "printer name". However, in the administrator print-instruction list illustrated in FIG. 8, the printer IDs and the printer names of the two image forming apparatuses 30a and 30b are set as the values of the items "printer ID" and "printer name". Note that, here, it is supposed that the printer ID of the image forming apparatus 30a is "abc-0001", and the printer ID of the image forming apparatus 30b is "abc-0002".

Additionally, the user name of the item "user name" is a name of a user who has provided the print instruction. In step S27, the administrator print-instruction list is obtained by using the administrator account. Accordingly, "administrator" is set as the user name in all records included in the administrator print-instruction list. In other words, when the image forming apparatuses 30 log in to the cloud print server 50 with the administrator account, the image forming apparatuses 30 can view all print instructions stored in the cloud printer sever 50. However, it seems as if all of the print instructions were print instructions provided by the administrator. Accordingly, the users who have provided the print instructions cannot be distinguished from one another.

FIGS. 9A to 9C illustrate examples of the client print-instruction lists that the image forming apparatuses 30 obtain in step S28. FIG. 9A illustrates an example of the client print-instruction list obtained by using the client account of the client A. FIG. 9B illustrates an example of the client print-instruction list obtained by using the client account of the client B. FIG. 9C illustrates an example of the client print-instruction list obtained by using the client account of the client C.

As illustrated in FIGS. 9A to 9C, in any of the client print-instruction lists, a number of the item "number" and a print-instruction ID of the item "print-instruction ID" are associated with each other. In step S28, the image forming apparatuses 30 temporarily log in to the cloud print server 50 with the client accounts, and obtain information items from the cloud print server 50. The only information items that can be obtained here are print-instruction IDs. Note that, because the details of the items "number" and "print-instruction ID" have already been mentioned in the description of FIG. 3, a description thereof is omitted here.

FIGS. 10A and 10B illustrate examples of the print-instruction tables that the image forming apparatuses 30 generate in step S29. FIG. 10A is an example of the print-instruction table that the image forming apparatus 30a generates in step S29. FIG. 10B is an example of the print-instruction table that the image forming apparatus 30b generates in step S29.

As illustrated in FIGS. 10A and 10B, any of the print-instruction tables is a table in which a number of the item "number", a print-instruction ID of the item "print-instruction ID", a printer name of the item "printer name", a file URL of the item "file URL", a ticket URL of the item "ticket URL", the number of pages of the item "number of pages", a generation date and time of the item "generation date and time", and a user name of the item "user name" are associated with one another. Note that, because the details of the items "number", "print-instruction ID", "printer name", "file URL", "ticket URL", "number of pages", "generation date and time", and "user name" have already been mentioned in the description of FIG. 3, a description thereof is omitted here.

In step S29, the print-instruction tables are generated by verifying the administrator print-instruction list, which is illustrated in FIG. 8, against the client print-instruction lists for the individual clients, which are illustrated in FIGS. 9A to 9C. More specifically, each "administrator" of the item "user name" of the administrator print-instruction list illustrated in FIG. 8 is replaced with a client that have been used when a client print-instruction list including the corresponding print-instruction ID among the client print-instruction lists illustrated in FIGS. 9A to 9C have been obtained. Furthermore, filtering using the printers ID is performed. Consequently, the print-instruction table illustrated in FIG. 10A and the print-instruction table illustrated in FIG. 10B are generated in the image forming apparatus 30a and the image forming apparatus 30b, respectively.

Note that, in the second exemplary embodiment, the administrator account and the client accounts are held in the account management server 60, and the image forming apparatuses 30 temporarily read and utilize the administrator account and the client accounts. However, a source from which the administrator account and the client accounts are obtained is not limited thereto. For example, the administrator account and the client accounts may be held in an ID card or the like, and the image forming apparatuses 30 may temporarily read and utilize the administrator account and the client accounts. Also in this case, after the image forming apparatuses 30 temporarily utilize the administrator account and the client accounts, the image forming apparatuses 30 may discard the administrator account and the client accounts from a security improvement point of view.

Hardware Configuration of Image Forming Apparatus 30

Figure 11:
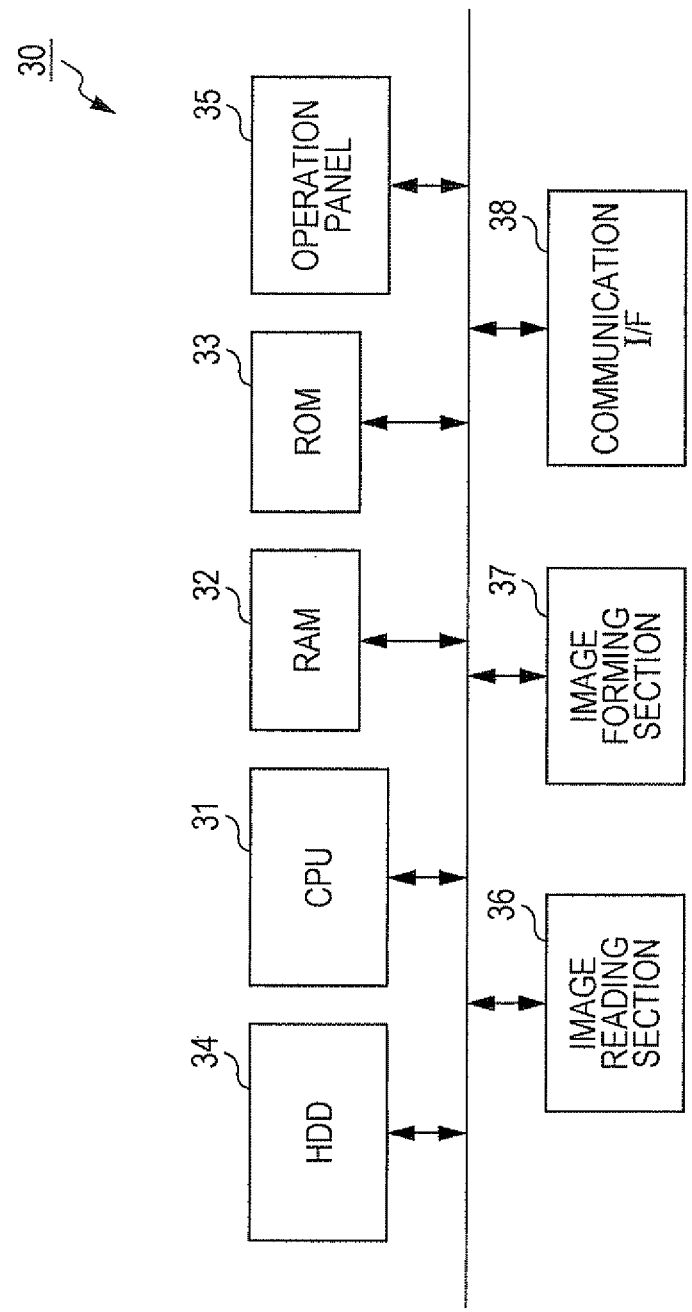
FIG. 11 is a diagram illustrating an example of a hardware configuration of an image forming apparatus according to an exemplary embodiment of the present invention.

FIG. 11 illustrates a diagram illustrating an example of a hardware configuration of the image forming apparatus 30.

As illustrated in FIG. 11, the image forming apparatus 30 includes a central processing unit (CPU) 31, the RAM 32, a read-only memory (ROM) 33, the HDD 34, the operation panel 35, an image reading section 36, an image forming section 37, and a communication interface (I/F) 38.

The CPU 31 loads, into the RAM 32, various types of programs stored in the ROM 33 or the like, and executes the various types of programs, thereby realizing individual functions described below.

The RAM 32 is a memory that is used as a working memory or the like of the CPU 31.

The ROM 33 is a memory that stores the various types of programs or the like executed by the CPU 31.

The HDD 34 is, for example, a magnetic disk device that stores an image data item read by the image reading section 36, an image data item that is used for image formation performed in the image forming section 37, or the like.

The operation panel 35 is, for example, a touch panel that displays various types of information items and that receives an operation input from a user.

The image reading section 36 reads an image recorded on a recording medium such as a sheet of paper. Here, the image reading section 36 is, for example, a scanner. A charge coupled device (CCD) scanner or a contact image sensor (CIS) scanner may be used. Regarding the CCD scanner, a document is irradiated with light emitted from a light source, and reflects the light. In the CCD scanner, the reflected light is reduced by a lens, and received by CCDs. Regarding the CSI scanner, a document is successively irradiated with light from a light emitting diode (LED) light source, and reflects the light. In the CIS scanner, the reflected light is received by CISs.

The image forming section 37 forms an image on a recording medium. Here, the image forming section 37 is, for example, a printer. An electrophotographic printer or an inkjet printer may be used. In the electrophotographic printer, toner adhered to a photoreceptor is transferred onto a recording medium to form an image. In the inkjet printer, ink is discharged onto a recording medium to form an image.

The communication I/F 38 performs transmission and reception of various types of information items among other apparatuses via a network.

Functional Configuration of Image Forming Apparatus 30

Figure 12:
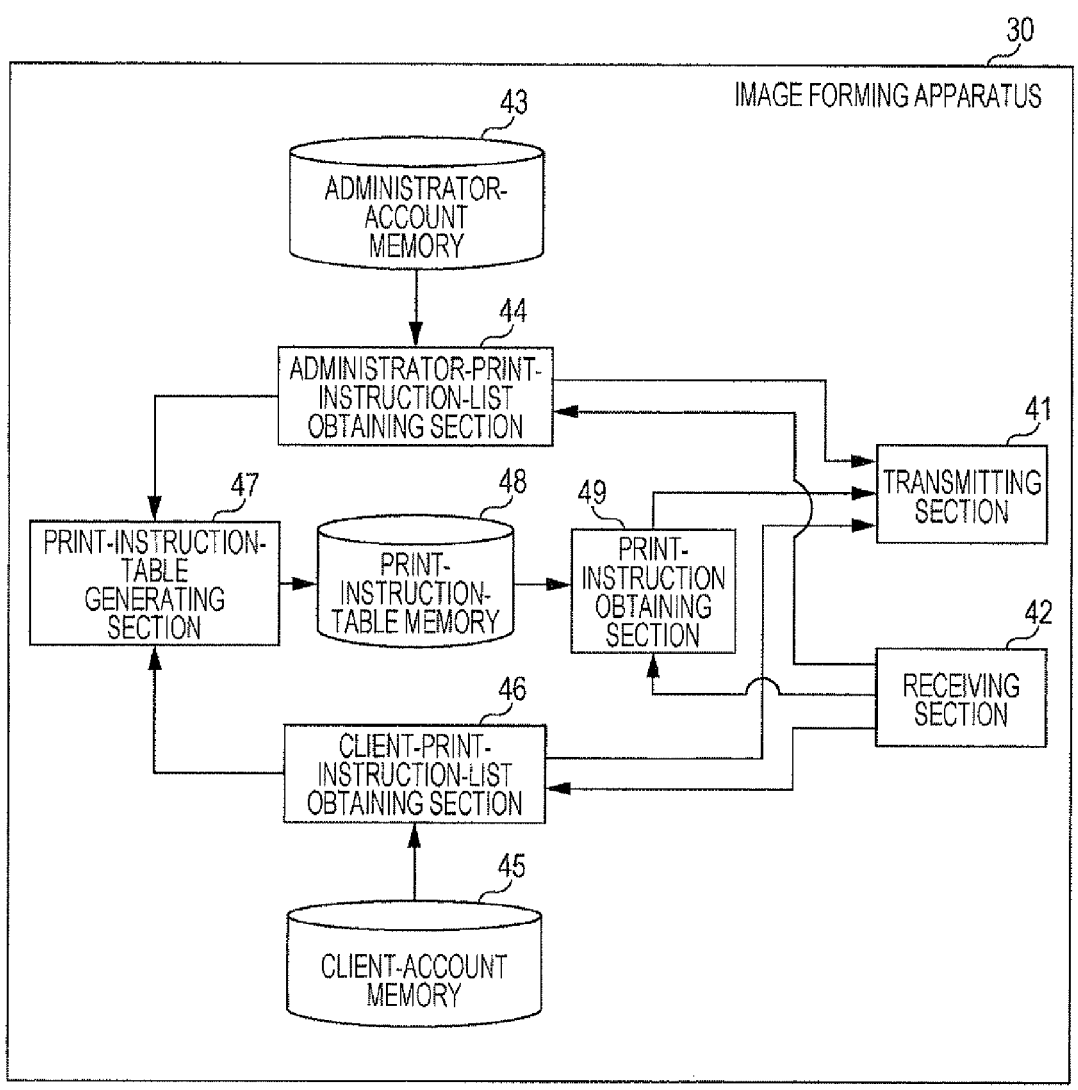
FIG. 12 is a block diagram illustrating an example of a functional configuration of the image forming apparatus according to the exemplary embodiment of the present invention.

FIG. 12 is a block diagram illustrating an example of a functional configuration of the image forming apparatus 30.

As illustrated in FIG. 12, the image forming apparatus 30 includes a transmitting section 41 and a receiving section 42. Additionally, the image forming apparatus 30 further includes an administrator-account memory 43, an administrator-print-instruction-list obtaining section 44, a client-account memory 45, and a client-print-instruction-list obtaining section 46. Moreover, the image forming apparatus 30 further includes a print-instruction-table generating section 47, a print-instruction-table memory 48, and a print-instruction obtaining section 49.

The transmitting section 41 transmits, in accordance with an instruction provided from the administrator-print-instruction-list obtaining section 44, a request to obtain an administrator print-instruction list to the cloud print server 50. Furthermore, the transmitting section 41 transmits, in accordance with an instruction provided from the client-print-instruction-list obtaining section 46, a request to obtain client print-instruction lists to the cloud print server 50. Additionally, the transmitting section 41 transmits, in accordance with an instruction provided from the print-instruction obtaining section 49, a request to obtain print instructions to the cloud print server 50.

The receiving section 42 receives an administrator print-instruction list from the cloud print server 50, and passes on the administrator print-instruction list to the administrator-print-instruction-list obtaining section 44. Furthermore, the receiving section 42 receives client print-instruction lists from the cloud print server 50, and passes on the client print-instruction lists to the client-print-instruction-list obtaining section 46. Additionally, the receiving section 42 receives print instructions from the cloud print server 50, and passes on the print instructions to the print-instruction obtaining section 49.

The administrator-account memory 43 stores an administrator account that is an account of an administrator who has registered the image forming apparatus 30 with the cloud print service. In the present exemplary embodiment, the administrator is used as an example of a registrant who has registered the printing apparatus in the holding apparatus, and the administrator account is used as an example of an information item concerning the registrant. Moreover, the administrator-account memory 43 is provided as an example of a first memory that stores the information item concerning the registrant.

The administrator-print-instruction-list obtaining section 44 logs in to the cloud print server 50 with the administrator account stored in the administrator-account memory 43, and calls, for example, a JOB LIST API, thereby obtaining an administrator print-instruction list that includes print-instruction IDs and printer IDs and that is to be used to obtain print instructions. In the present exemplary embodiment, the JOB LIST API is used as an example of a command to obtain an information item concerning a print data item held by the holding apparatus. The administrator print-instruction list is used as an example of multiple obtainment information items that are to be used to obtain multiple print data items. Moreover, the administrator-print-instruction-list obtaining section 44 is provided as an example of a first obtaining section that obtains the multiple obtainment information items and a first receiving section that receives the multiple obtainment information items.

The client-account memory 45 stores client accounts that are accounts of clients who share the image forming apparatus 30 which the administrator has registered with the cloud print service. In the present exemplary embodiment, the clients are used as examples of an instructor who provides an instruction instructing the holding apparatus to hold a print data item that is to be used in printing performed by the printing apparatus. The client accounts are used as examples of an information item concerning the instructor. Additionally, the client-account memory 45 is provided as an example of a second memory that stores the information item concerning the instructor.

The client-print-instruction-list obtaining section 46 logs in to the cloud print server 50 with the client accounts stored in the client-account memory 45, and calls, for example, the JOB LIST API, thereby obtaining the client print-instruction lists including print-instruction IDs. In the present exemplary embodiment, the print-instruction IDs are used as examples of print-data identification information items with which print data items are identified. The client print-instruction list is used as an example of at least one of print-data identification information items. Moreover, the client-print-instruction-list obtaining section 46 is provided as an example of a second receiving section that obtains the at least one of print-data identification information items and a second receiving section that receives the at least one of print-data identification information items.

The print-instruction-table generating section 47 generates a print-instruction table in which each of the client accounts that have been used when a corresponding one of the client print-instruction lists has been obtained is set for records including the print-instruction IDs included in the client print-instruction list obtained by the client-print-instruction-list obtaining section 46 among the records included in the administrator print-instruction list obtained by the administrator-print-instruction-list obtaining section 44. Furthermore, a table that has been subjected to filtering with the printer ID of the image forming apparatus 30 may be used as the print-instruction table. In the present exemplary embodiment, the print-instruction-table generating section 47 is provided as an example of either one of the following sections: a retrieving section that retrieves, from the multiple obtainment information items obtained by the first obtaining section, at least one of obtainment information items including the at least one of print-data identification information items obtained by the second obtaining section, one of the at least one of obtainment information items retrieved by the retrieving section being an information item to be used to obtain a print data item that is held by the holding apparatus in accordance with the instruction provided by the instructor and that is to be used in printing performed by the printing apparatus; and a retrieving section that retrieves, from the multiple obtainment information items obtained by the first obtaining section, at least one of obtainment information items including the at least one of print-data identification information items obtained by the second obtaining section and a specific apparatus identification information item with which the printing apparatus is identified, one of the at least one of obtainment information items retrieved by the retrieving section being an information item to be used to obtain a print data item that is held by the holding apparatus in accordance with the instruction provided by the instructor and that is to be used in printing performed by the printing apparatus.

The print-instruction-table memory 48 stores the print-instruction table generated by the print-instruction-table generating section 47.

The print-instruction obtaining section 49 obtains print instructions on the basis of the print-instruction table stored in the print-instruction-table memory 48. In the present exemplary embodiment, the print-instruction obtaining section 49 is provided as an example of a third obtaining section that obtains a print data item.

Operation of Image Forming Apparatus 30

Figure 13:
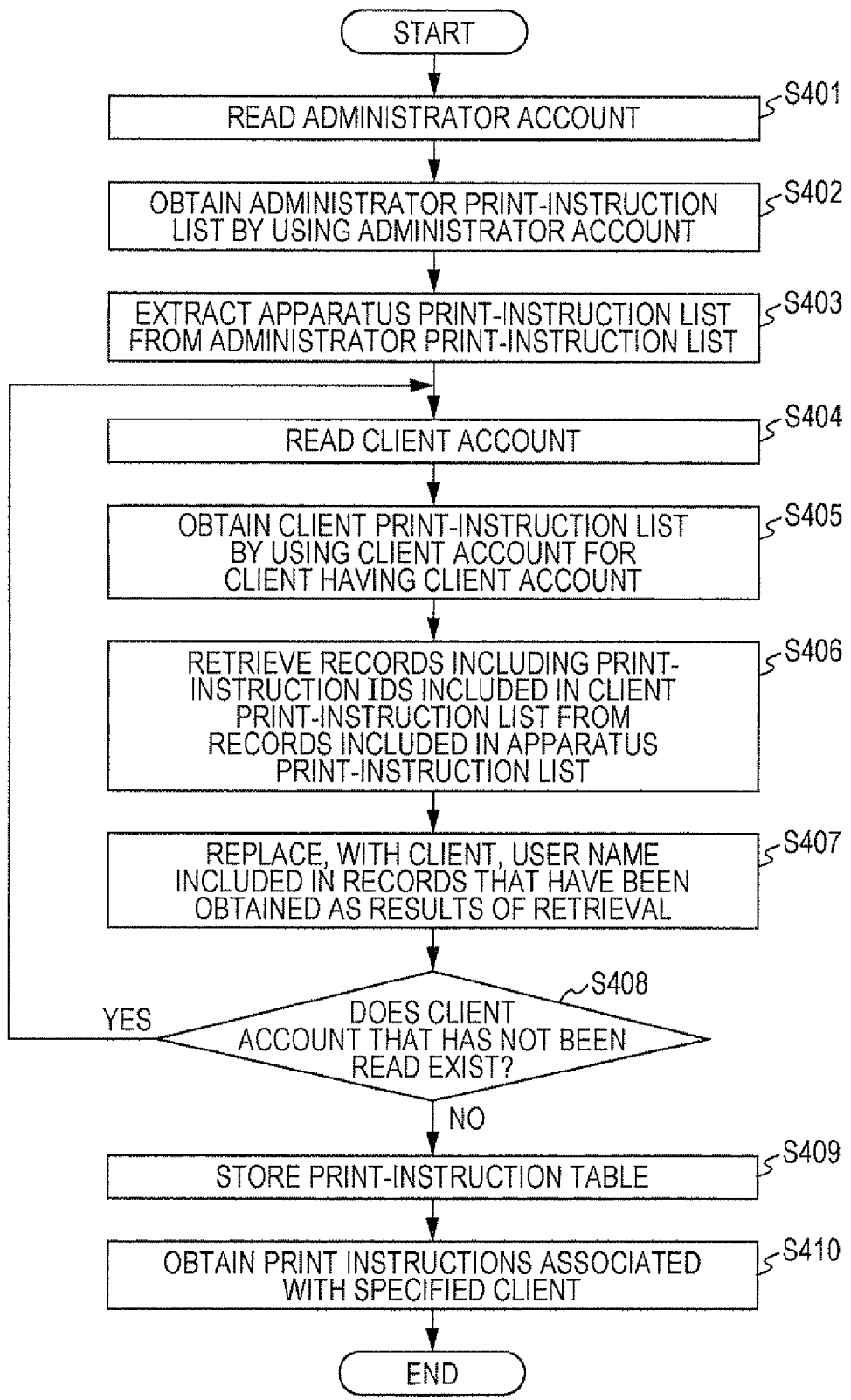
FIG. 13 is a flowchart illustrating an example of an operation of the image forming apparatus according to the exemplary embodiment of the present invention.

FIG. 13 is a flowchart illustrating an example of an operation of the image forming apparatus 30.

As illustrated in FIG. 13, in the image forming apparatus 30, first, the administrator-print-instruction-list obtaining section 44 reads the administrator account stored in the administrator-account memory 43 (step S401).

Furthermore, the administrator-print-instruction-list obtaining section 44 logs in to the cloud print service with the administrator account which has been read, and obtains the administrator print-instruction list (step S402). More specifically, the administrator-print-instruction-list obtaining section 44 calls, for example, the JOB LIST API, whereby the transmitting section 41 transmits a request to obtain a print-instruction list to the cloud print server 50 via the communication I/F 38. Then, in response to the request, the receiving section 42 receives, via the communication I/F 38, the administrator print-instruction list that has been transmitted from a transmitting section (an example of a first transmitting section), which is not illustrated, of the cloud print server 50. The administrator-print-instruction-list obtaining section 44 receives the administrator print-instruction list from the receiving section 42.

Then, the print-instruction-table generating section 47 receives the administrator print-instruction list from the administrator-print-instruction-list obtaining section 44. The print-instruction-table generating section 47 extracts only records including the printer ID of the printing apparatus among the records included in the administrator print-instruction list, and holds the extracted records as an apparatus print-instruction list (step S403). For example, in the second exemplary embodiment, in a case in which the image forming apparatus 30a extracts an apparatus print-instruction list, the image forming apparatus 30a extracts only records including the printer ID "abc-0001" among the records included in the administrator print-instruction list illustrated in FIG. 8, and holds the extracted records as the apparatus print-instruction list illustrated in FIG. 10A (however, at this point in time, "administrator" is still set as the user name in all of the records). Note that, step S403 is a step that is necessary only in the second exemplary embodiment. In the first exemplary embodiment, the administrator print-instruction list may be held as the apparatus print-instruction list, without being processed.

When the administrator print-instruction list is held by the print-instruction-table generating section 47 as described above, next, the client-print-instruction-list obtaining section 46 reads one of the client accounts stored in the client-account memory 45 (step S404).

Moreover, the client-print-instruction-list obtaining section 46 logs in to the cloud print service with the read client account, and obtains the client print-instruction list (step S405). More specifically, the client-print-instruction-list obtaining section 46 calls, for example, the JOB LIST API, whereby the transmitting section 41 transmits a request to obtain a print-instruction list to the cloud print server 50 via the communication I/F 38. Then, in response to the request, the receiving section 42 receives, via the communication I/F 38, the client print-instruction list that has been transmitted from a transmitting section (an example of a second transmitting section), which is not illustrated, of the cloud print server 50. The client-print-instruction-list obtaining section 46 receives the client print-instruction list from the receiving section 42.

Then, the print-instruction-table generating section 47 receives the client print-instruction list from the client-print-instruction-list obtaining section 46, and retrieves records including print-instruction IDs included in the client print-instruction list from the records included in the apparatus print-instruction list stored in step S403 (step S406). In this case, "administrator" is set as the user name in all of the records included in the apparatus print-instruction list. The print-instruction-table generating section 47 replaces, in the records that have been obtained as results of retrieval, the user name with the user name associated with the client account that has been read this time (step S407). For example, in the second exemplary embodiment, records including the print-instruction IDs included in the client print-instruction list illustrated in FIG. 9A are retrieved from the records included in the apparatus print-instruction list illustrated in FIG. 10A. In the record whose number is "1" and the record whose number is "5" that are records obtained as results of retrieval, the user name is replaced with the "client A". Note that, in step S406, for each of the print-instruction IDS included in the client print-instruction list, when a record including the print-instruction ID is not found, the print instruction may be neglected because it is considered that the print instruction which is identified with the print-instruction ID is not a print instruction provided for the printing apparatus.

After that, the client-print-instruction-list obtaining section 46 determines whether or not, among the client accounts stored in the client-account memory 45, a client account that has not been read exists (step S408).

As a result, when it is determined that a client account which has not been read exists, the client-print-instruction-list obtaining section 46 performs the processes of steps S404 to S407 for the next client account.

In contrast, when it is determined that a client account which has not been read does not exist, the control returns to the print-instruction-table generating section 47 again. The print-instruction-table generating section 47 stores, in the print-instruction-table memory 48, the print-instruction table that is obtained as a result of the processes of steps S404 to S407 which have been performed for all of the client accounts (step S409).

When the print-instruction table is stored in the print-instruction-table memory 48 as described above, finally, the print-instruction obtaining section 49 obtains the print instructions (document files and setting files) associated with a specified client (step S410). More specifically, the print-instruction obtaining section 49 retrieves file URLs and ticket URLs from the records which are included in the print-instruction table and in which the name of the specified client is set as the user name. Accordingly, the transmitting section 41 transmits, via the communication I/F 38 to the cloud print server 50, a request to obtain document files from the file URLs and a request to obtain setting files from the ticket URLs. Then, in response to the requests, the receiving section 42 receives, via the communication I/F 38, the document files and the setting files that have been transmitted from the cloud print server 50. The print-instruction obtaining section 49 receives the document files and the setting files from the receiving section 42.

Then, in a case in which the image forming section 37 performs printing on the basis of the print instructions obtained by the print-instruction obtaining section 49, the following processes may be performed.

Firstly, a process of outputting user information items concerning users who have provided the individual print instructions to a print-state list screen showing a state of printing based on the print instructions, a print history report in which results of printing based on the print instructions are printed, or the like may be performed. Note that, here, only the state of printing and the results of printing are used as output targets. However, any information item concerning printing may be used as an output target. In other words, the function of performing this process is an example of a processing section that outputs an information item concerning printing using a print data item so that the information item is associated with the information item concerning the instructor.

Secondly, a process of temporarily storing the print instructions in the image forming apparatus 30, and of performing printing based on one of the print instructions when a user makes a request for the print instruction may be performed. Note that the function of performing this process is an example of a processing section that performs, in response to an input of the information item concerning the instructor, printing using a print data item.

Thirdly, a process of managing, on a user-by-user basis for users who have provided the print instructions, the numbers of copies in a case of printing based on the print instructions may be performed. Note that, here, although only the number of copies in a case of printing is used as a management target, any information item concerning printing may be used as a management target. In other words, the function of performing this process is an example of a processing section that manages an information item concerning printing using a print data item so that the information item is associated with the information item concerning the instructor.

Fourthly, a process of imposing a limitation, on a user-by-user basis, on printing based on the print instructions through collaboration between the print instructions and user output-authority information items (an output upper limit, a color limitation, and so forth) that are managed by the image forming apparatus 30 or an external server may be performed. Note that the function of performing this process is an example of a processing section that imposes, on the basis of an information item that is defined in advance for the information item concerning the instructor, a limitation on printing using a print data item.

However, the above processes are provided as examples. Any process using user information items concerning printing based on the print instructions may be performed. In other words, the function of performing this process may be considered as an example of a processing section that performs, using the information item concerning the instructor, a process associated with printing using a print data item.

However, in the above-described exemplary embodiments, each of the print instructions included in the administrator print-instruction list is associated with a corresponding one of the clients. The reason for this is that the image forming apparatus 30 can obtain the client print-instruction lists for all of the clients because all of the clients who share the image forming apparatus 30 have made, to the image forming apparatus 30, applications to utilize the cloud print service.

However, in reality, a certain client (referred to as a "client D") may, without making an application to utilize the cloud print service to the image forming apparatus 30, set a setting for sharing the image forming apparatus 30 in the cloud print service via another image forming apparatus or the like. In this case, the client account of the client D is not stored in the client-account memory 45. Accordingly, a client print-instruction list for the client D is not obtained in step S405 illustrated in FIG. 13. Thus, at a point in time when a client account that has not been processed no longer exists in step S408 illustrated in FIG. 13, a state occurs, in which print instructions that are included in the administrator print-instruction list and that have been provided by the client D are not associated with any client.

For this reason, in a present exemplary embodiment, when such a state occurs, an inquiry about a client account of a client who shares the image forming apparatus 30 is made to the cloud print server 50. Then, the processes of steps S405 to S410 illustrated in FIG. 13 are performed using the client account that has been obtained as a result of this inquiry, instead of the client account that is read in step S404 illustrated in FIG. 13. In this case, the client-print-instruction-list obtaining section 46 is an example of a second obtaining section that obtains a specific print-data identification information item with which a specific print data item that is held by the holding apparatus in accordance with an instruction provided by an instructor who has not made an application to provide the instruction is identified. The print-instruction-table generating section 47 is an example of a determining section that determines that, among the multiple obtainment information items obtained by the first obtaining section, a specific obtainment information item including the specific print-data identification information item obtained by the second obtaining section is an obtainment information item which is to be used to obtain a print data item that is held by the holding apparatus in accordance with the instruction provided by the instructor who has not made an application to provide the instruction and that is to be used in printing performed by the printing apparatus.

Note that, in the above description, a case in which the present exemplary embodiment is applied to a cloud print system is supposed, and it is supposed that a server computer which transmits print instructions to the image forming apparatus 30 is the cloud print server 50. However, the present invention is not limited thereto. The present exemplary embodiment may be applied to a print system other than the cloud print system if a print server included in the print system does not transmit an information item with which a user is identified in a case of transmitting an print instruction to the image forming apparatus 30.

Note that a program that realizes the present exemplary embodiment may be provided by a communication medium. Alternatively, as a matter of course, the program may be stored in a recording medium such as a compact disc read-only memory (CD-ROM) and may be provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing apparatus comprising:
   a first memory that stores a registrant information item concerning a registrant who has registered the printing apparatus as a print destination with a holding apparatus, the holding apparatus holding a print data item that is to be used for printing at the print destination;
   a second memory that stores an instructor information item concerning an instructor who provides an instruction instructing the holding apparatus to hold a print data item that is to be used in printing performed by the printing apparatus;
   a first obtaining section that obtains a plurality of obtainment information items by executing a command, the command being a command to obtain an information item concerning a print data item held by the holding apparatus, using the registrant information item stored in the first memory, each of the plurality of obtainment information items being an information item that includes one of a plurality of print-data identification information items with which a plurality of print data items to be used in printing performed by the printing apparatus are identified and that is to be used to obtain one of the plurality of print data items;
   a second obtaining section that obtains, by executing the command using the instructor information item stored in the second memory, at least one of print-data identification information items with which at least one of print data items held by the holding apparatus in accordance with an instruction provided by the instructor is identified; and a retrieving section that retrieves, from the plurality of obtainment information items obtained by the first obtaining section, at least one of obtainment information items including the at least one of print-data identification information items obtained by the second obtaining section, one of the at least one of obtainment information items retrieved by the retrieving section being an information item to be used to obtain a print data item that is held by the holding apparatus in accordance with the instruction provided by the instructor and that is to be used in printing performed by the printing apparatus.

2. The printing apparatus according to claim 1, wherein the first memory stores a registrant information item concerning the registrant who has registered the printing apparatus and another apparatus as the print destinations with the holding apparatus, wherein the first obtaining section obtains, by executing the command using the registrant information item stored in the first memory, a plurality of obtainment information items, each of the plurality of obtainment information items being an information item that includes one of a plurality of print-data identification information items with which a plurality of print data items to be used in printing performed by the printing apparatus or the other apparatus are identified, that includes one of a plurality of apparatus identification information items with which a plurality of apparatuses to perform printing using the plurality of print data items are identified, and that is to be used to obtain one of the plurality of print data items, and wherein the retrieving section retrieves, from the plurality of obtainment information items obtained by the first obtaining section, at least one of obtainment information items including the at least one of print-data identification information items obtained by the second obtaining section and a specific apparatus identification information item with which the printing apparatus is identified, one of the at least one of obtainment information items retrieved by the retrieving section being an information item to be used to obtain a print data item that is held by the holding apparatus in accordance with the instruction provided by the instructor and that is to be used in printing performed by the printing apparatus.

3. The printing apparatus according to claim 2, wherein there are a plurality of instructors who have provided instructions instructing the holding apparatus to hold print data items that are to be used in printing performed by the printing apparatus, and the second memory stores an instructor information item concerning an instructor who has made, to the printing apparatus, an application to provide the instruction among the plurality of instructors, wherein the second obtaining section obtains, from the holding apparatus, an instructor information item concerning an instructor who has not made, to the printing apparatus, an application to provide the instruction among the plurality of instructors who have provided the instructions instructing the holding apparatus to hold print data items that are to be used in printing performed by the printing apparatus, and obtains, by executing the command using the instructor information item concerning the instructor who has not made an application to provide the instruction, a specific print-data identification information item with which a specific print data item that is held by the holding apparatus in accordance with the instruction provided by the instructor who has not made an application to provide the instruction is identified, and wherein the retrieving section retrieves, from the plurality of obtainment information items obtained by the first obtaining section, a specific obtainment information item including the specific print-data identification information item obtained by the second obtaining section, the specific obtainment information item retrieved by the retrieving section being an information item to be used to obtain a print data item that is held by the holding apparatus in accordance with the instruction provided by the instructor who has not made an application to provide the instruction and that is to be used in printing performed by the printing apparatus.

4. The printing apparatus according to claim 1, wherein there are a plurality of instructors who have provided instructions instructing the holding apparatus to hold print data items that are to be used in printing performed by the printing apparatus, and the second memory stores an instructor information item concerning an instructor who has made, to the printing apparatus, an application to provide the instruction among the plurality of instructors, wherein the second obtaining section obtains, from the holding apparatus, an instructor information item concerning an instructor who has not made, to the printing apparatus, an application to provide the instruction among the plurality of instructors who have provided the instructions instructing the holding apparatus to hold print data items that are to be used in printing performed by the printing apparatus, and obtains, by executing the command using the instructor information item concerning the instructor who has not made an application to provide the instruction, a specific print-data identification information item with which a specific print data item that is held by the holding apparatus in accordance with the instruction provided by the instructor who has not made an application to provide the instruction is identified, and wherein the retrieving section retrieves, from the plurality of obtainment information items obtained by the first obtaining section, a specific obtainment information item including the specific print-data identification information item obtained by the second obtaining section, the specific obtainment information item retrieved by the retrieving section being an information item to be used to obtain a print data item that is held by the holding apparatus in accordance with the instruction provided by the instructor who has not made an application to provide the instruction and that is to be used in printing performed by the printing apparatus.

5. The printing apparatus according to claim 1, further comprising a third obtaining section that obtains a print data item on the basis of the at least one of obtainment information items retrieved by the retrieving section, one of the at least one of obtainment information items being an information item to be used to obtain the print data item that is held by the holding apparatus in accordance with the instruction provided by the instructor and that is to be used in printing performed by the printing apparatus.

6. The printing apparatus according to claim 5, further comprising a processing section that performs, using the instructor information item, a process associated with printing using the print data item obtained by the third obtaining section.

7. The printing apparatus according to claim 6, wherein the processing section manages or outputs an information item concerning printing using the print data item obtained by the third obtaining section so that the information item is associated with the instructor information item.

8. The printing apparatus according to claim 6, wherein the processing section performs, in response to an input of the instructor information item, printing using the print data item obtained by the third obtaining section.

9. The printing apparatus according to claim 6, wherein the processing section imposes, on the basis of an information item that is defined in advance for the instructor information item, a limitation on printing using the print data item obtained by the third obtaining section.

10. A print system comprising:
a holding apparatus with which a print destination is registered and which holds a print data item that is to be used for printing at the print destination; and
a printing apparatus that performs printing using a print data item held by the holding apparatus,
the holding apparatus including
a first transmitting section that transmits a plurality of obtainment information items to the printing apparatus when a command, the command being a command to obtain an information item concerning a print data item held by the holding apparatus, using a registrant information item concerning a registrant who has registered the printing apparatus as the print destination is executed by the printing apparatus, each of the plurality of obtainment information items being an information item that includes one of a plurality of print-data identification information items with which a plurality of print data items to be used in printing performed by the printing apparatus are identified and that is to be used to obtain one of the plurality of print data items, and
a second transmitting section that, when the command using an instructor information item concerning an instructor who provides an instruction instructing the holding apparatus to hold a print data item that is to be used in printing performed by the printing apparatus is executed by the printing apparatus, transmits, to the printing apparatus, at least one of print-data identification information items with which at least one of print data items held by the holding apparatus in accordance with an instruction provided by the instructor is identified,
the printing apparatus including
a first memory that stores the registrant information item,
a second memory that stores the instructor information item,
a first receiving section that receives, by executing the command using the registrant information item stored in the first memory, the plurality of obtainment information items which have been transmitted by the first transmitting section,
a second receiving section that receives, by executing the command using the instructor information item stored in the second memory, the at least one of print-data identification information items transmitted by the second transmitting section, and
a retrieving section that retrieves, from the plurality of obtainment information items received by the first receiving section, at least one of obtainment information items including the at least one of print-data identification information items received by the second receiving section, one of the at least one of obtainment information items retrieved by the retrieving section being an information item which is to be used to obtain a print data item that is held by the holding apparatus in accordance with the instruction provided by the instructor and that is to be used in printing performed by the printing apparatus.

11. A printing method comprising:
storing an information item in a first memory, the information item being a registrant information item concerning a registrant who has registered a printing apparatus as a print destination with a holding apparatus, the holding apparatus holding a print data item that is to be used for printing at the print destination;
storing an information item in a second memory, the information item being an instructor information item concerning an instructor who provides an instruction instructing the holding apparatus to hold a print data item that is to be used in printing performed by the printing apparatus;
obtaining a plurality of obtainment information items by executing a command, the command being a command to obtain an information item concerning a print data item held by the holding apparatus, using the registrant information item stored in the first memory, each of the plurality of obtainment information items being an information item that includes one of a plurality of print-data identification information items with which a plurality of print data items to be used in printing performed by the printing apparatus are identified and that is to be used to obtain one of the plurality of print data items;
obtaining, by executing the command using the instructor information item stored in the second memory, at least one of print-data identification information items with which at least one of print data items held by the holding apparatus in accordance with an instruction provided by the instructor is identified; and
retrieving, from the plurality of obtainment information items which have been obtained, at least one of obtainment information items including the at least one of print-data identification information items which has been obtained, one of the at least one of obtainment information items that has been retrieved being an information item to be used to obtain a print data item that is held by the holding apparatus in accordance with the instruction provided by the instructor and that is to be used in printing performed by the printing apparatus.

12. A non-transitory computer-readable medium storing a program causing a computer to execute a process, the process comprising:
storing an information item in a first memory, the information item being a registrant information item concerning a registrant who has registered a printing apparatus as a print destination with a holding apparatus, the holding apparatus holding a print data item that is to be used for printing at the print destination;
storing an information item in a second memory, the information item being an instructor information item concerning an instructor who provides an instruction instructing the holding apparatus to hold a print data item that is to be used in printing performed by the printing apparatus;
obtaining a plurality of obtainment information items by executing a command, the command being a command to obtain an information item concerning a print data item held by the holding apparatus, using the registrant information item stored in the first memory, each of the plurality of obtainment information items being an information item that includes one of a plurality of print-data identification information items with which a plurality of print data items to be used in printing performed by the printing apparatus are identified and that is to be used to obtain one of the plurality of print data items;

obtaining, by executing the command using the instructor information item stored in the second memory, at least one of print-data identification information items with which at least one of print data items held by the holding apparatus in accordance with an instruction provided by the instructor is identified; and retrieving, from the plurality of obtainment information items which have been obtained, at least one of obtainment information items including the at least one of print-data identification information items which has been obtained, one of the at least one of obtainment information items that has been retrieved being an information item to be used to obtain a print data item that is held by the holding apparatus in accordance with the instruction provided by the instructor and that is to be used in printing performed by the printing apparatus.

* * * * *